United States Patent
Walsh et al.

(10) Patent No.: US 10,209,402 B2
(45) Date of Patent: Feb. 19, 2019

(54) GRID CELL PINCHOUT FOR RESERVOIR SIMULATION

(71) Applicant: Schlumberger Technology Corporation, Sugar Land, TX (US)

(72) Inventors: Dominic Walsh, Abingdon (GB); Paul Woodhams, Oxfordshire (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 866 days.

(21) Appl. No.: 14/565,877

(22) Filed: Dec. 10, 2014

(65) Prior Publication Data

US 2015/0160370 A1    Jun. 11, 2015

Related U.S. Application Data

(60) Provisional application No. 61/914,185, filed on Dec. 10, 2013.

(51) Int. Cl.
*G01V 99/00*    (2009.01)

(52) U.S. Cl.
CPC .................. *G01V 99/005* (2013.01)

(58) Field of Classification Search
CPC .......................... G01V 99/005; G06F 17/5009
See application file for complete search history.

(56) References Cited

U.S. PATENT DOCUMENTS

| | | | | |
|---|---|---|---|---|
| 6,928,399 B1* | 8/2005 | Watts, III | ................ | E21B 49/00 702/13 |
| 7,672,818 B2* | 3/2010 | Watts, III | ................ | E21B 43/00 703/10 |
| 2008/0133186 A1* | 6/2008 | Li | ................ | G06F 17/5018 703/2 |
| 2010/0082724 A1* | 4/2010 | Diyankov | ............... | G06F 17/12 708/520 |
| 2011/0313745 A1* | 12/2011 | Mezghani | ............... | G01V 99/00 703/10 |
| 2013/0090907 A1* | 4/2013 | Maliassov | ........... | G06F 17/5009 703/10 |
| 2014/0236559 A1* | 8/2014 | Fung | ........... | E21B 41/00 703/10 |

(Continued)

OTHER PUBLICATIONS

Fung, L. S. K., Ding, X. Y., & Dogru, A. H. (Feb. 18, 2013), "An Unstructured Gridding Method for Densely-Spaced Complex Wells in Full-Field Reservoir Simulation." Society of Petroleum Engineers. doi:10.2118/163648-MS.*

(Continued)

*Primary Examiner* — Aniss Chad
*Assistant Examiner* — Steven W Crabb
(74) *Attorney, Agent, or Firm* — Jaime A. Castano

(57) ABSTRACT

A method, apparatus, and program product utilize a generalized grid cell pinchout operation to remove small cells from a reservoir simulation grid, e.g., prior to running a reservoir simulation. The generalized grid cell pinchout operation may utilize a connectivity matrix representing transmissibilities of one or more "pinch" cells to be removed as well as that of "background" cells that neighbor the pinch cells. Removal of the pinch cells includes determining a Schur complement of the connectivity matrix to generate a reduced connectivity matrix from the connectivity matrix.

19 Claims, 6 Drawing Sheets

(56) References Cited

U.S. PATENT DOCUMENTS

2015/0100293 A1* 4/2015 Hoteit .................. E21B 43/16
                                                         703/10

OTHER PUBLICATIONS

Gringarten, et al., "New Geologic Grids for Robust Geostatistical Modeling of Hydrocarbon Reservoirs," presented at Geostats 2008, Santiago, Chile.
Mallison, et al., "Unstructured Cut-Cell Grids for Modeling Complex Reservoirs," SPE 163642, SPE Reservoir Simulation Symposium held in the Woodlands, Texas, USA Feb. 18-20, 2013.

* cited by examiner

GRID CELL PINCHOUT FOR RESERVOIR SIMULATION

CROSS-REFERENCE TO RELATED APPLICATION

This application claims the benefit of U.S. Provisional Application No. 61/914,185 filed on Dec. 10, 2013 by Paul Woodhams and Dominic Walsh, the entire disclosure of which is incorporated by reference herein in its entirety.

BACKGROUND

Reservoir simulation often requires the numerical solution of the equations that describe the physics governing the complex behaviors of multi-component, multiphase fluid flow in natural porous media in the reservoir and other types of fluid flow elsewhere in the production system. The complexity of the physics that govern reservoir fluid flow leads to systems of coupled nonlinear partial differential equations that are not amenable to conventional analytical methods. As a result, numerical solution techniques are necessary.

A variety of mathematical models, formulations, discretization methods, and solution strategies have been developed and are associated with a grid imposed upon an area of interest in a geological formation. Reservoir simulation can be used to predict production rates from reservoirs and can be used to determine appropriate improvements, such as facility changes or drilling additional wells, that can be implemented to improve production.

A grid imposed upon an area of interest in a model of a geological formation may be structured or unstructured. Such grids are comprised of cells, each cell having one or more unknown properties, but with all the cells in the grid having one common unknown variable, generally pressure. Other unknown properties may include, but are not limited to, fluid properties such as water saturation or temperature for example, or to "rock properties," such as permeability or porosity to name a few.

Grid generation may be constrained by the presence of geological faults, such that the generation of cells is driven by fault boundaries, with the fault boundaries defining the surfaces of adjacent cells. Cells may also be generated with non-cuboid geometries and varying volumes. Particularly with complex and/or highly-faulted geological formations, such "cut-cell" grids provide substantially greater accuracy over grids that enforce a regular array of identically sized cells.

On the other hand, algorithms that generate cut-cell grids may result in the creation of numerous arbitrarily small cells. It has been found, however, that the small cells can significantly impact performance, even with parallel simulators, and in some instances, may cause simulation errors.

Therefore, there is a need in the art for a manner of effectively and efficiently removing small and/or unwanted cells from a grid used for reservoir simulation.

SUMMARY

A reservoir simulation grid may be processed by accessing a reservoir simulation grid comprising a plurality of cells, determining one or more pinch cells to be removed from the reservoir simulation grid, constructing a connectivity matrix representing transmissibilities between the one or more pinch cells and a plurality of background cells in the reservoir simulation grid that neighbor the one or more pinch cells, where the connectivity matrix includes a plurality of entries arranged in a plurality of rows and a plurality of columns, where the connectivity matrix includes a row of entries for each of the one or more pinch cells and the plurality of background cells, where the connectivity matrix includes a column of entries for each of the one or more pinch cells and the plurality of background cells, and where the connectivity matrix includes, for each connected pair of cells among the one or more pinch cells and the plurality of background cells, an entry from among the plurality of entries that stores a transmissibility value associated with the transmissibility between the connected pair of cells, and removing the one or more pinch cells from the reservoir simulation grid, where removing the one or more pinch cells from the reservoir simulation grid includes determining a Schur complement of the connectivity matrix to generate a reduced connectivity matrix from the connectivity matrix, the reduced connectivity matrix representing transmissibilities between the plurality of background cells.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIG. 6 is a graphical illustration of an example connectivity matrix for the set of cells of FIG. 5.

FIG. 7 illustrates splitting of the connectivity matrix of FIG. 6.

DETAILED DESCRIPTION

Figure 1:
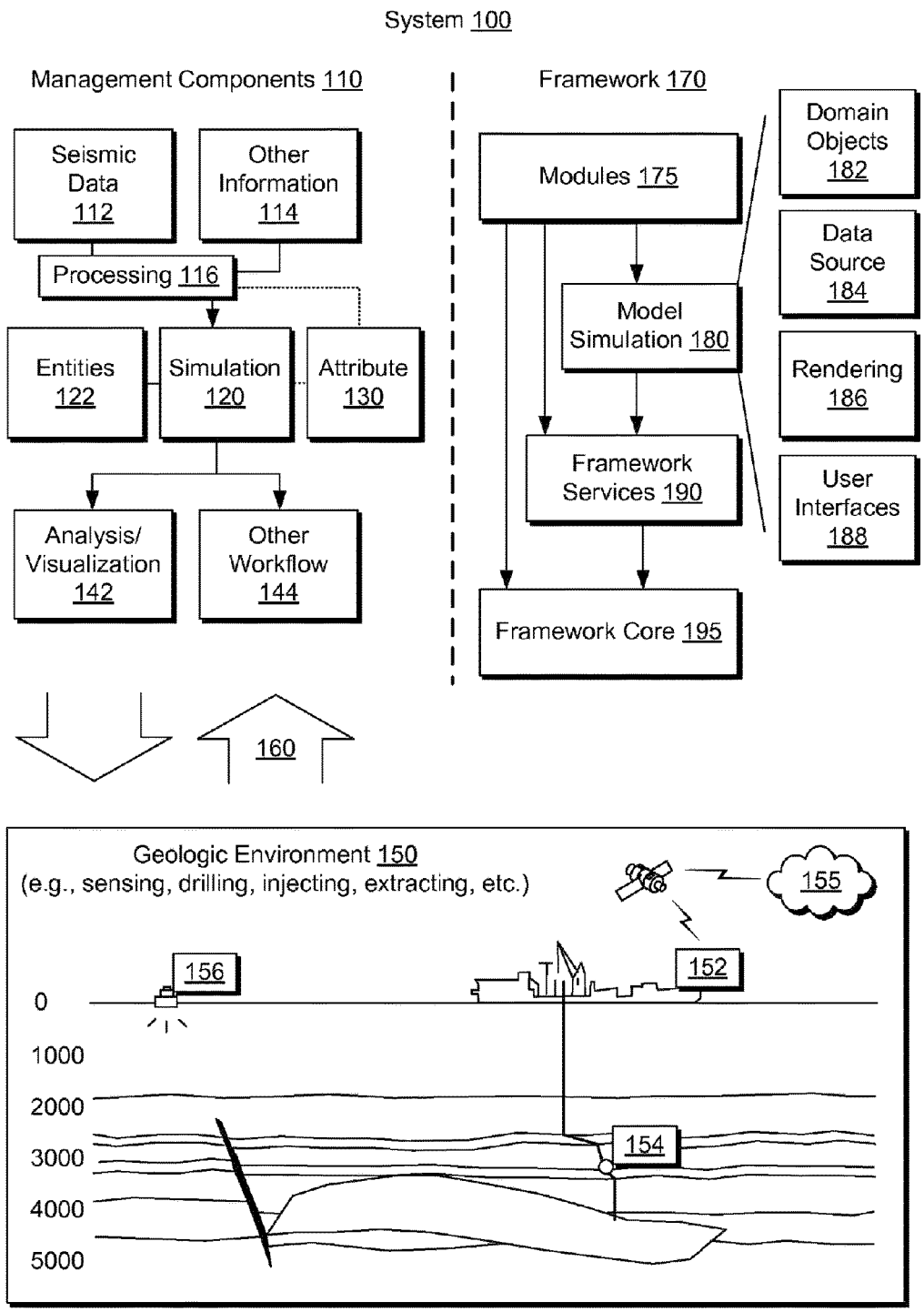
FIG. 1 is a block diagram of an example hardware and software environment for use in simulating a geological environment in accordance with implementations of various technologies and techniques described herein.

The herein-described embodiments provide a method, apparatus, and program product that utilize a generalized grid cell pinchout operation to remove small cells from a reservoir simulation grid, e.g., prior to running a reservoir simulation. The generalized grid cell pinchout operation may utilize a connectivity matrix representing transmissibilities of one or more "pinch" cells to be removed as well as that of "background" cells that neighbor the pinch cells. Removal of the pinch cells includes determining a Schur complement of the connectivity matrix to generate a reduced connectivity matrix from the original connectivity matrix.

In this regard, a grid cell pinchout operation may be considered to be an operation that removes a small or other unwanted cell from a reservoir simulation grid, e.g., a cell that, if left in the grid, may decrease simulation performance (e.g., by increasing runtime), and/or may cause an error or failure in a simulation. A reservoir simulation grid may be considered to be a computer model of a geological formation, e.g., a sedimentary basin, which in some embodiments may be constrained by one or more faults. A grid may be structured or unstructured, and various algorithms may be used to generate the grid, as will be apparent to one of ordinary skill in the art.

A connectivity matrix is a mathematical matrix including rows and columns of entries representative of the transmissibility between cells in a reservoir simulation grid. As will become more apparent below, a Gaussian elimination operation, e.g., using a Schur complement operation, may be performed on a connectivity matrix in some embodiments of the invention to reduce the connectivity matrix and determine transmissibilities for a plurality of background cells after the removal of one or more pinch cells.

In some embodiments, a reservoir simulation grid may be processed by accessing a reservoir simulation grid comprising a plurality of cells, determining one or more pinch cells to be removed from the reservoir simulation grid, constructing a connectivity matrix representing transmissibilities between the one or more pinch cells and a plurality of background cells in the reservoir simulation grid that neighbor the one or more pinch cells, where the connectivity matrix includes a plurality of entries arranged in a plurality of rows and a plurality of columns, where the connectivity matrix includes a row of entries for each of the one or more pinch cells and the plurality of background cells, where the connectivity matrix includes a column of entries for each of the one or more pinch cells and the plurality of background cells, and where the connectivity matrix includes, for each connected pair of cells among the one or more pinch cells and the plurality of background cells, an entry from among the plurality of entries that stores a transmissibility value associated with the transmissibility between the connected pair of cells, and removing the one or more pinch cells from the reservoir simulation grid, where removing the one or more pinch cells from the reservoir simulation grid includes determining a Schur complement of the connectivity matrix to generate a reduced connectivity matrix from the connectivity matrix, the reduced connectivity matrix representing transmissibilities between the plurality of background cells.

Some embodiments further include splitting the connectivity matrix into first, second, third and fourth sub-matrices, the first sub-matrix representing transmissibilities between background cells, the second sub-matrix representing transmissibilities from background cells to pinch cells, the third sub-matrix representing transmissibilities from pinch cells to background cells, and the fourth sub-matrix representing transmissibilities between pinch cells, and inverting the fourth sub-matrix, where determining the Schur complement of the connectivity matrix includes performing a matrix multiplication between the second sub-matrix, the third sub-matrix and the inverted fourth-sub matrix and performing a matrix subtraction that subtracts a result of the matrix multiplication from the first sub-matrix.

Some embodiments additionally include arranging each of the plurality of rows of entries to separate the rows for the plurality of background cells from the one or more rows for the one or more pinch cells, and arranging each of the plurality of columns of entries to separate the columns for the plurality of background cells from the one or more columns for the one or more pinch cells. In addition, in some embodiments, arranging each of the plurality of rows of entries includes reordering the plurality of rows of entries, and arranging each of the plurality of columns of entries includes reordering the plurality of columns of entries.

In some embodiments, determining the one or more pinch cells is performed in response to user input, while in some embodiments, determining the one or more pinch cells includes automatically determining the one or more pinch cells based on a small cell criterion.

Some embodiments additionally include dropping at least one insignificant value from the reduced connectivity matrix. In addition, in some embodiments, the connectivity matrix only represents transmissibilities of pinch cells and background cells that neighbor pinch cells. Some embodiments also include running a reservoir simulation using the reservoir simulation grid after removing the one or more pinch cells.

Some embodiments also include distributing a plurality of domains of the reservoir simulation grid to a plurality of parallel processes, where the connectivity matrix is a first connectivity matrix associated with a first domain among the plurality of domains, where constructing the first connectivity matrix is performed by a first process among the plurality of parallel processes. Such embodiments may also include constructing a second connectivity matrix for a second domain among the plurality of domains with a second process among the plurality of parallel processes. Also, in some embodiments, constructing the first connectivity matrix includes the first process making an inter-domain call to the second process to obtain a transmissibility for a cell in the second domain of the reservoir simulation grid.

Some embodiments may also include an apparatus including at least one processor and program code configured upon execution by the at least one processor to process a reservoir simulation grid in any of the manners discussed herein. Some embodiments may also include a program product including a computer readable medium and program code stored on the computer readable medium and configured upon execution by at least one processor to process a reservoir simulation grid in any of the manners discussed herein.

Other variations and modifications will be apparent to one of ordinary skill in the art.

Hardware and Software Environment

Turning now to the drawings, wherein like numbers denote like parts throughout the several views, FIG. 1 illustrates an example of a system 100 that includes various management components 110 to manage various aspects of a geologic environment 150 (e.g., an environment that includes a sedimentary basin, also referred to herein as a geological formation). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, reservoirs, etc. In the system 100, the entities 122 may include virtual representations of actual physical entities that are reconstructed for purposes of simulation. The entities 122 may include entities based on data acquired via sensing, observation, etc. (e.g., the seismic data 112 and other information 114).

In an example embodiment, the simulation component 120 may rely on a software framework such as an object-based framework. In such a framework, entities may include entities based on pre-defined classes to facilitate modeling and simulation. A commercially available example of an object-based framework is the MICROSOFT®.NET™ framework (Redmond, Wash.), which provides a set of extensible object classes. In the .NET™ framework, an object class encapsulates a module of reusable code and associated data structures. Object classes may be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120. Alternatively, or in addition, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results. Additionally, or alternatively, output from the simulation component 120 may be input to one or more other workflows, as indicated by a workflow component 144.

In an example embodiment, the management components 110 may include features of a commercially available simulation framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) may develop collaborative workflows and integrate operations to streamline processes. Such a framework may be considered an application and may be considered a data-driven application (e.g., where data is input for purposes of simulating a geologic environment).

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a reservoir or reservoirs may be simulated with respect to one or more enhanced recovery techniques (e.g., consider a thermal process such as SAGD, etc.). As an example, a simulator may accept as input a grid such as, for example, a structured grid for purposes of simulating one or more physical phenomena. As an example, such a structured grid may be generated by transforming a grid in a computational space to a grid in a real space, for example, where one or more faults have been introduced into the grid in the computational space such that the one or more faults exist in the structured grid in the real space (e.g., structured according to an indexing system).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for seamless integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software may include a framework for model building and visualization. Such a model may include one or more grids.

The model simulation layer 180 may provide domain objects 182, act as a data source 184, provide for rendering 186 and provide for various user interfaces 188. Rendering 186 may provide a graphical environment in which applications may display their data while the user interfaces 188 may provide a common look and feel for application user interface components.

In the example of FIG. 1, the domain objects 182 may include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project may be accessed and restored using the model simulation layer 180, which may recreate instances of the relevant domain objects.

In the example of FIG. 1, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc.

Figure 2:
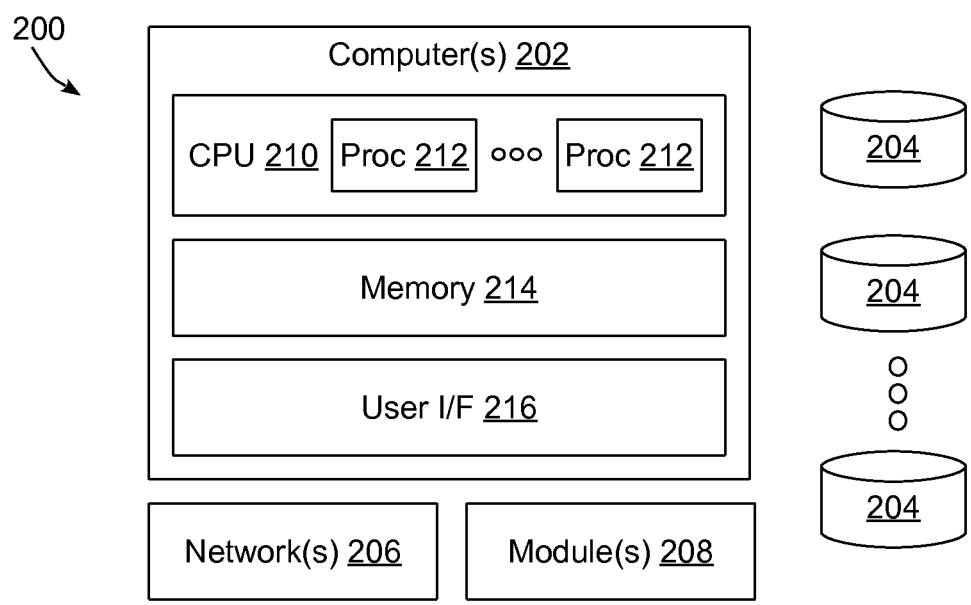
FIG. 2 is a block diagram of an example data processing system suitable for use in the environment of FIG. 1.

FIG. 2 shows an example of a data processing system 200 that includes one or more computers 202, one or more storage devices 204, one or more networks 206 and one or more modules 208, and suitable for hosting a data processing environment consistent with the invention. As to the one or more computers 202, each computer may include a central processing unit 210, which may include one or more processors (e.g., or processing cores) 212, and a memory 214 for storing instructions (e.g., modules), for example, executable by at least one of the one or more processors. A computer 202 may also include a user interface 216 through which a user may interact with the computer, e.g., via a keyboard, a pointing device, a display, etc., although in some instances, e.g., for a server-type computer, user interaction may be performed using a remote device coupled to the computer over a network. A computer may also include one or more network interfaces (e.g., wired or wireless), one or more graphics cards, a display interface (e.g., wired or wireless), etc. As an example, data may be provided in the storage device(s) 204 where the computer(s) 202 may access the data via the network(s) 206 and process the data via the module(s) 208, for example, as stored in the memory 214 and executed by the processor(s) 212.

Memory 214 may represent the random access memory (RAM) devices comprising the main storage of a computer 202, as well as any supplemental levels of memory, e.g., cache memories, non-volatile or backup memories (e.g., programmable or flash memories), read-only memories, etc. In addition, memory 214 may be considered to include memory storage physically located elsewhere in a computer 202, e.g., any cache memory in a processor or processing core, as well as any storage capacity used as a virtual memory, e.g., as stored on a storage device 204 or on another computer coupled to a computer 202.

Each computer 202 generally operates under the control of an operating system and executes or otherwise relies upon various computer software applications, components, programs, objects, modules, data structures, etc., e.g., one or more modules 208. In general, the routines executed to implement the embodiments disclosed herein, whether implemented as part of an operating system or a specific application, component, program, object, module or sequence of instructions, or even a subset thereof, will be referred to herein as "computer program code," or simply "program code." Program code generally comprises one or more instructions that are resident at various times in various memory and storage devices in a computer, and that, when read and executed by one or more hardware-based processing units in a computer (e.g., processors, processing cores, or other hardware-based circuit logic), cause that computer to perform the steps embodying desired functionality. Moreover, while embodiments have and hereinafter will be described in the context of fully functioning computers and computer systems, those skilled in the art will appreciate that the various embodiments are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by a computer 202. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Furthermore, it will be appreciated by those of ordinary skill in the art having the benefit of the instant disclosure that the various operations described herein that may be performed by any program code, or performed in any routines, workflows, or the like, may be combined, split, reordered, omitted, and/or supplemented with other techniques known in the art, and therefore, the invention is not limited to the particular sequences of operations described herein.

Those skilled in the art will recognize that the example environment illustrated in FIGS. 1 and 2 is not intended to limit the invention. Indeed, those skilled in the art will recognize that other alternative hardware and/or software environments may be used without departing from the scope of the invention.

Grid Cell Pinchout

A recent trend in the oil and gas industry is to capture a complex fault geometry that may be present in a geological model within a reservoir simulation grid. Doing so may lead to grids with complex cell connectivity and cells with arbitrarily small volumes. Some reservoir simulators can address the complex cell connectivity problem by not relying on structure; however, doing so may lead to the generation of numerous arbitrarily small cells in the grid. The small volume cells, however, can greatly impact performance in some instances, and in other instances may even cause the simulation of these models to fail.

Small volume cells may in some instances be addressed by simplifying the geology or by manually manipulating the grid. The former reduces the simulation accuracy, while the latter requires the manual involvement of a user, which can be costly and time consuming.

In the embodiments discussed hereinafter, automated removal of small volume cells, a process referred to herein as "pinchout," may be used to remove small volume cells while accounting for the connectivity between neighboring or adjacent cells. As such, simplification and removal of small volume cells is generally based on physics rather than geometry, enabling the physics of flow to be maintained while removing small volume cells.

In the illustrated embodiment, automatic grid cell pinchout is performed by mathematically representing an area of interest in a grid using a matrix referred to herein as a connectivity matrix. Each row corresponds to a cell and each off diagonal coefficient represents a flow path to a neighboring cell. The value of this coefficient is referred to as the Transmissibility (T) and the size corresponds to the ease with which fluid may pass to the neighboring cell.

Consider, for example, a cell "a" connected to a neighboring cell "b."

The flow away from cell a to cell b, $F_{ab}$, may be considered the difference between the pressures at a and b ($P_a$ and $P_b$) multiplied by the transmissibility between a and b (Eq. 1 below). The flow over a period of time, $\Delta t$, is equal to the change in mass in the cell over that time (Eq. 2 below). Combining the equations one can form an equation for the change in mass in the cell as a function of the transmissibilities between the points and the pressures at the points (Eq. 3 below).

$$F_{ab} = T(P_a - P_b) \quad (1)$$

$$\Delta t F_{ab} = M_a^{t+1} - M_a^t = \Delta M_a \quad (2)$$

$$\Delta M_a = \Delta t \begin{pmatrix} T & -T \end{pmatrix} \begin{pmatrix} P_a \\ P_b \end{pmatrix} \quad (3)$$

The same analysis may performed for cell b, again with flow going away from the cell being considered, gives a function for the change in mass at b as a function of transmissibilities and pressures. The equations for a and b may then be combined to form a linear system of equations represented by a matrix equation (Eq. 4 below):

$$\begin{pmatrix} \Delta M_a \\ \Delta M_b \end{pmatrix} = \Delta t \begin{pmatrix} T & -T \\ -T & T \end{pmatrix} \begin{pmatrix} P_a \\ P_b \end{pmatrix} \quad (4)$$

The construction of this system of equations may be generalized to multiple connections to a cell to generate a connectivity matrix for a region of a grid. In particular, when constructing a connectivity matrix, each cell may be considered in turn, with an assumption made that all flows are away from the cell, thereby ensuring a positive diagonal in the matrix. To construct an arbitrary connectivity matrix for use in a pinchout operation in one embodiment, a square matrix may be allocated with the number of rows equal to the number of cells involved in a pinchout, where each row corresponds to a cell involved in the pinchout. The cells involved in a pinchout are generally considered to be one or more cells to be pinched out, designated herein as "pinch" (P) cells, along with the cells that neighbor the pinch cells, designated herein as "background" (B) cells.

Entries may then be inserted into the matrix as shown below in Eqs. 5 and 6, where i is the row, j is the column, n is the number of edges for cell i and $T_{ij}$ is the transmissibility between cells i and j:

$$i = j: \sum_{j=0}^{n} T_{ij} \quad (5)$$

$$i \neq j: -T_{ij} \quad (6)$$

The connectivity matrix may then be considered in isolation, with reordering and splitting used to configure the connectivity matrix for further processing. In particular, if the equations for each cell are arranged or ordered such that the background cells are first, followed by the pinch cells, the matrix may be structured as shown in Eq. 7 below, with $T_{BB}$, the connections between background cells, $T_{BP}$, the connections between background cells and pinch cells, $T_{PB}$, the connections between pinch cells and background cells and $T_{PP}$, the connections between pinch cells.

$$\begin{pmatrix} T_{BB} & T_{BP} \\ T_{PB} & T_{PP} \end{pmatrix} \quad (7)$$

Next, a block Gaussian elimination may be performed at the block level on the connectivity matrix, e.g., by calculating the Schur complement of the connectivity matrix. Taking the Schur complement may involve performing a matrix multiplication operation using $T_{BP}$, $T_{PB}$ and the inverse of $T_{PP}$, along with a matrix subtraction operation that subtracts a result of the matrix multiplication operation from $T_{BB}$. By doing so, the connectivity matrix may be reduced to a matrix that represents the transmissibilities between the different background cells, as shown in Eq. 8 below:

$$S(T_{BB}) = T_{BB} - T_{BP} T_{PP}^{-1} T_{PB} \quad (8)$$

The inverse $T_{PP}$ may be calculated in some embodiments using Gaussian elimination, and may be performed in parallel in some embodiments. In addition, the inverse $T_{PP}$ may be calculated, for example, by using a solver library such as SuperLU, MUMPS, Pardiso, etc., and the determination of such an inverse would be well within the abilities of one of ordinary skill in the art having the benefit of the instant disclosure. The determination may be computationally demanding in some instances, but generally is performed only once, and is generally suitable for partitioning into independent selections capable of being performed in parallel.

In the general case the inverse of $T_{PP}$ may be viewed as summing the strength of all possible paths connecting between any two background cells. As such, in some embodiments every pinch cell to be removed in a region of interest in a grid may be processed at the same time, as the removal process may introduce new connections, and if any of the new connections were to another cell that is to be removed, a dependency may exist. If however any pinch cells fall into unconnected sets, the pinch cells may processed independently.

Figure 3:
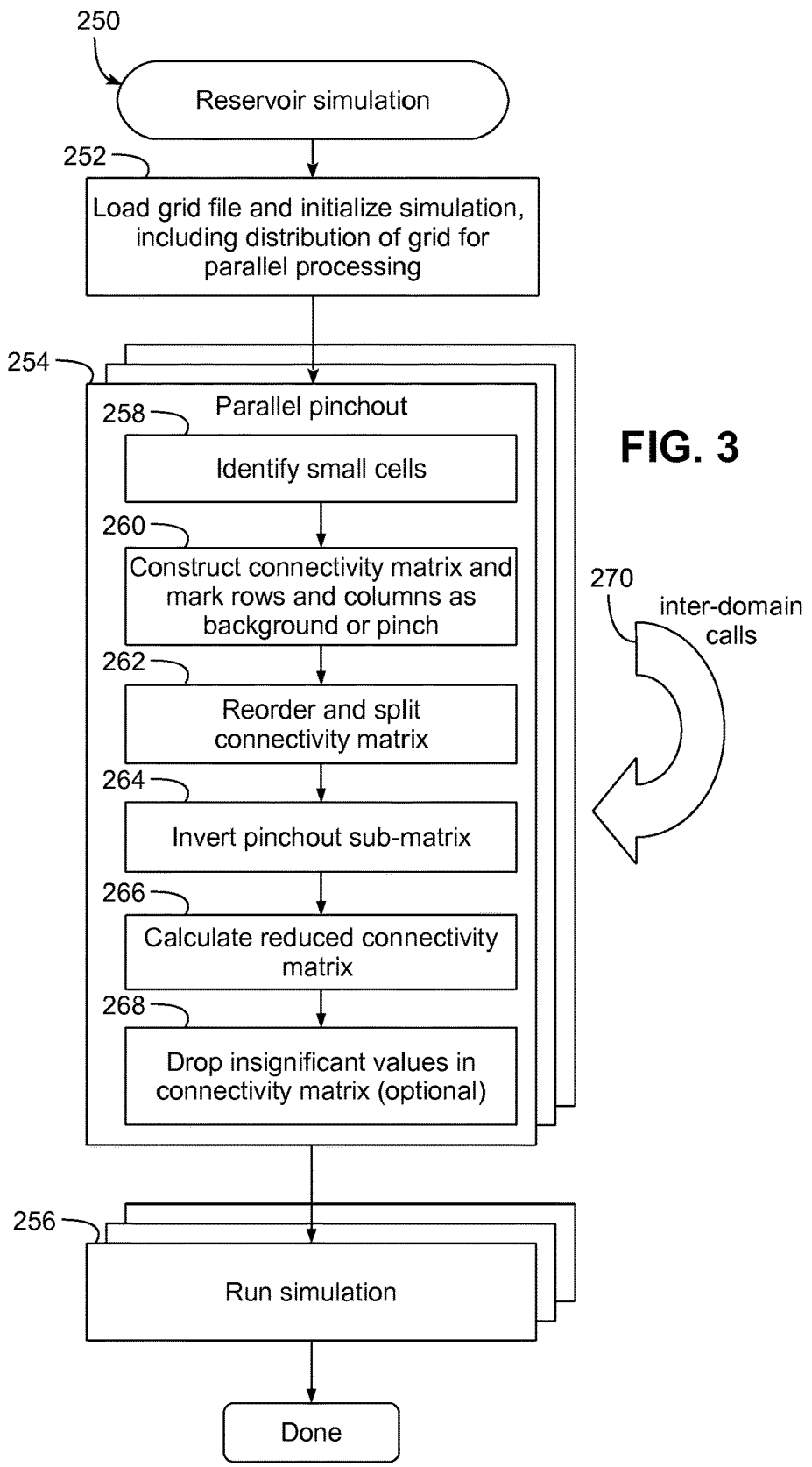
FIG. 3 is a flowchart illustrating an example sequence of operations for performing reservoir simulation in accordance with implementations of various technologies and techniques described herein.

Now turning to FIG. 3, an example sequence of operations for performing a reservoir simulation 250 incorporating the herein-described grid cell pinchout operation, is illustrated in greater detail. In this embodiment, parallel simulation is performed, whereby regions of a grid, referred to herein as domains, are distributed to multiple processes, e.g., distributed among a plurality of processors and/or computers to accelerate the simulation. Various manners of partitioning simulation operations among multiple processes may be used, e.g., by assigning different wedges (i.e., regions between faults) to different processes. Furthermore, non-parallel simulation may also be performed in some embodiments.

Starting at block 252, the simulation may be initialized by loading the grid file and distributing the grid among parallel processes, as well as performing other initialization operations that will be apparent to one of ordinary skill in the art having the benefit of the instant disclosure. Next, a parallel pinchout routine 254 is called to perform grid cell pinchout in the manner described herein, as a precedent step to running a simulation with the grid in block 256. As represented by the multiple blocks represented in FIG. 3, routine 254 may be performed in parallel for different regions of the grid. In other embodiments, however, pinchout may be performed in a single process. Furthermore, the simulation in block 256 may also be performed in parallel, in a manner that will be appreciated by one of ordinary skill in the art having the benefit of the instant disclosure. In still other embodiments, grid cell pinchout may be performed at other points relative to running a simulation, or separate of a simulation entirely.

Routine 254 begins in block 258 by identifying small cells in the grid. The cells may be identified as small based upon a small cell criterion, e.g., based on absolute or relative volume or size, based upon one or more dimensions, based upon aspect ratio, or based on other characteristics that distinguish small cells from other cells in a grid. In addition, while in some embodiments the small cells may be identified in an automated manner, in other embodiments, the small cells may be identified manually by a user, and thus based on user input, or a combined manual/automatic process may be used where candidate small cells are automatically identified and a user is presented with the candidates for confirmation prior to initiating a grid cell pinchout operation.

Next, in block 260, a connectivity matrix is constructed of the identified small cells and the neighboring or adjacent cells thereto, and the cells are marked as either "pinch" (P) cells, representing the small cells to be removed, or "background" (B) cells, representing the neighboring or adjacent cells to the pinch cells. Each row corresponds to a cell and each off diagonal coefficient represents a flow path to a neighboring cell, as discussed above. The value of this coefficient is referred to as transmissibility (T) and the size corresponds to the ease with which fluid may pass to the neighbor cell. Generally, the connectivity matrix used by a process executing routine 254 includes each pinch cell in the region allocated to the process, as well as any background cells that neighbor the pinch cells.

Next, in block 262, the connectivity matrix is reordered and split as discussed above, by ordering or arranging the rows and columns such that the pinch cells follow the background cells in each row and column, and then splitting the matrix into four sub-matrices, $T_{BB}$, $T_{BP}$, $T_{PB}$ and $T_{PP}$. In some embodiments, the connectivity matrix may be constructed with the rows and columns already ordered to separate the rows/columns for the pinch cells from the rows/columns for the background cells. In still other embodiments, the individual sub-matrices may be determined without performing any ordering or arranging of rows/columns in the connectivity matrix.

Next, in block 264, $T_{PP}$, also referred to herein as a pinchout sub-matrix, is inverted, e.g., using a solver library such as SuperLU, MUMPS, Pardiso. It will be appreciated that for some pinchout operations, e.g., involving Z and XY pinchouts discussed in greater detail hereinafter, the inversion of the pinchout sub-matrix may incorporate sophisticated matrix inversion operations implemented by many solver libraries.

Next, in block 266, the reduced connectivity matrix is calculated, e.g., by taking or determining the Schur complement as discussed above in connection with Eq. 8. The connectivity matrix is thus reduced to represent the connectivities of the background cells, with the contributions of the pinch cells effectively removed. As such, from the perspective of the reservoir simulation grid, the pinch cells are removed as a result of using the reduced connectivity matrix.

Next, in block 268, it may be desirable in some embodiments to drop insignificant values from the reduced connectivity matrix, e.g., by setting to zero any matrix values falling to meet a particular threshold. In other embodiments, however, block 268 may be omitted.

Upon completion of block 268, routine 254 is complete, and the simulation may then be run as illustrated in block 256, and with the grid used for the simulation having small volume cells removed. In addition, as noted above, a grid cell pinchout operation may be performed using parallel processes assigned to different domains. As such, in some embodiments, inter-process communication, via inter-domain calls, may be performed as illustrated at 270 to enable processes to pass data between one another to evaluate connectivities between cells that are adjacent to one another across domain boundaries, e.g., to obtain a transmissibility for a neighboring cell assigned to a different domain of the reservoir simulation grid. It will also be appreciated that in different embodiments, the connectivity matrices used by the various processes may be considered to be separate connectivity matrices from one another, or alternatively sub-matrices of an overall connectivity matrix for the overall reservoir simulation grid.

Figure 4:
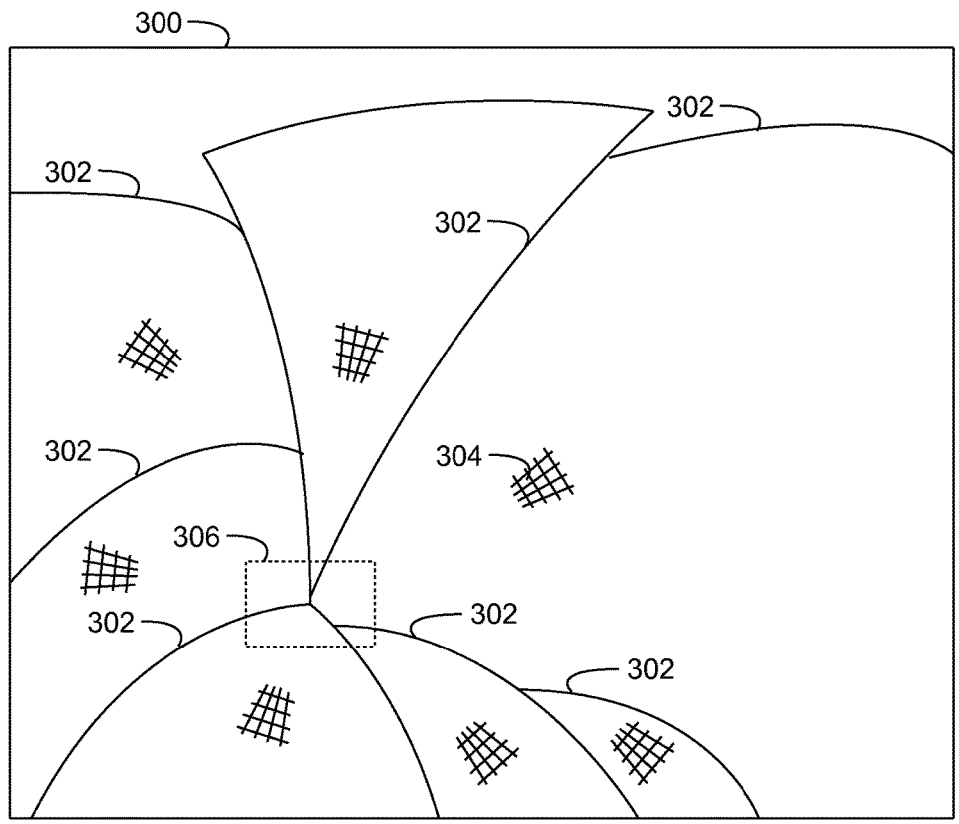
FIG. 4 illustrates an example grid for an example complex, highly-faulted geological formation.

FIGS. 4-8 graphically illustrate the operation of routine 254 on an example grid. FIG. 4, in particular, illustrates an example reservoir simulation grid 300 with a complex, highly-faulted geometry defined by numerous faults 302, and including a plurality of unstructured grid cells 304. Generation of grid 300 may be performed in a number of manners consistent with the invention, as will be appreciated by one of ordinary skill in the art having the benefit of the instant disclosure.

Figure 5A:
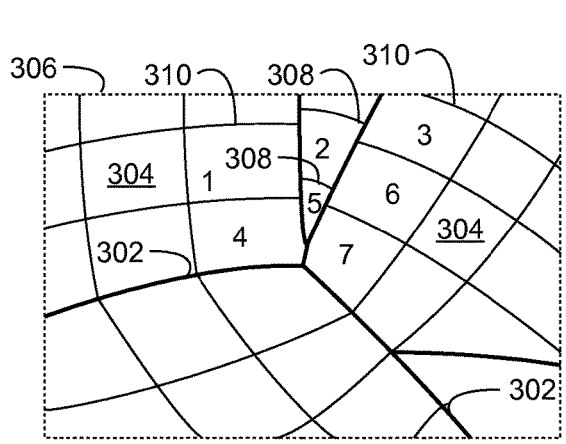
FIG. 5A is an enlarged view of an example set of cells in the grid of FIG. 4.
Figure 5B:
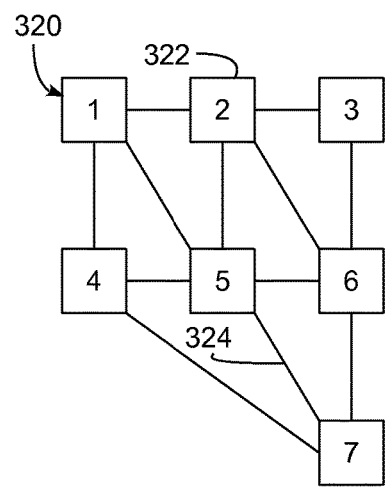
FIG. 5B is a connectivity graph for the set of cells illustrated in FIG. 5A.

FIG. 5A is an enlarged view of a region 306 of FIG. 4, showing, for the purposes of this example, two small volume cells defined proximate the intersection of four faults. The small volume cells are designated as pinch cells 308, and the neighboring cells, e.g., at 310, are designated as background cells. For the purposes of this example, the pinch and background cells are also designated as cells 1-7, and the connectivities between these cells are represented in FIG. 5B by a connectivity graph 320, where seven nodes 322 correspond to cells 1-7 and twelve paths 324 extending between the nodes correspond to the connectivities between the associated cells.

Figures 6, 7:
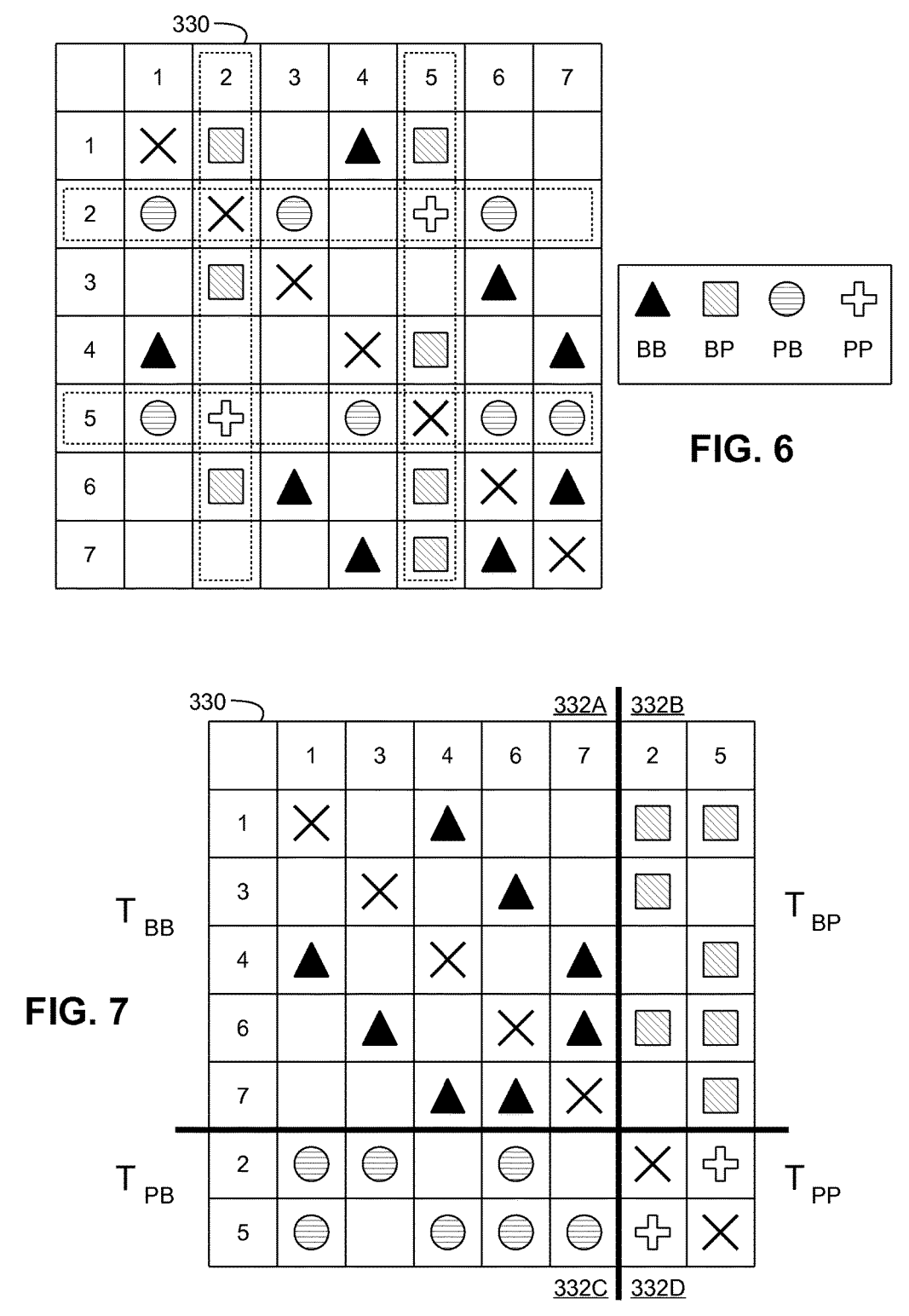

With reference again to block 258 of FIG. 3, cells 2 and 5 may be identified as small volume cells, and as a result, in block 260 a connectivity matrix may be constructed using cells 2 and 5 along with their neighboring cells (background cells 1, 3-4 and 6-7). As shown in FIG. 6, for example, a connectivity matrix 330 may include 49 (7×7) entries arranged into seven rows and seven columns, each labeled 1-7 to correspond to the seven cells involved in the grid cell pinchout operation.

The flow from each cell to each other cell may be represented by a transmissibility value stored in an entry at the corresponding row, column index in the matrix. Thus, for example, the flow from cell 1 to cell 2 is assigned to row 1, column 2.

As noted above, each cell may be marked as background or pinch, and for the purposes of simplifying the discussion hereinafter, FIG. 6 uses icons to represent the connections between background cells (BB, triangles), from background to pinch cells (BP, squares), from pinch to background cells (PB, circles) and between pinch cells (PP, pluses). Thus, as shown in FIG. 6, for each connected pair of cells (e.g., between background cells, from background cells to pinch cells, from pinch cells to background cells, and/or between pinch cells), the connectivity matrix includes an entry that stores a transmissibility value associated with the transmissibility between that connected pair of cells Returning again to FIG. 3, block 260 reorders and splits the connectivity matrix. Thus, as shown in FIG. 7, connectivity matrix 330 is reordered such that the background cells (cells 1, 3-4 and 6-7) are ordered before the pinch cells (cells 2 and 5) in each of the rows and the columns. Furthermore, the connectivity matrix is split into four sub-matrices 332A-332D, corresponding to $T_{BB}$, $T_{BP}$, $T_{PB}$ and $T_{PP}$ discussed above.

Figure 8:
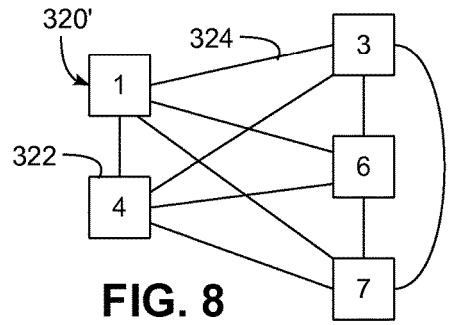
FIG. 8 illustrates the set of cells of FIG. 5A after pinchout of small cells.

Again referring to FIG. 3, once the connectivity matrix is reordered and split, the pinchout sub-matrix is inverted and the reduced connectivity matrix is calculated in the manner discussed above in connection with Eq. 8. FIG. 8 illustrates the result of the grid cell pinchout operation, whereby connectivity graph 320 of FIG. 5B is updated as illustrated at 320', with pinch cells 2 and 5 removed, leaving background cells 1, 3-4 and 6-7 shown in nodes 322 with paths 324 representing the connections therebetween.

Figure 9A:
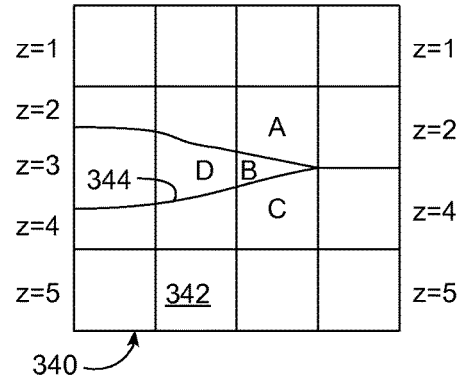
FIG. 9A illustrates another example grid for a geological formation.
Figure 9B:
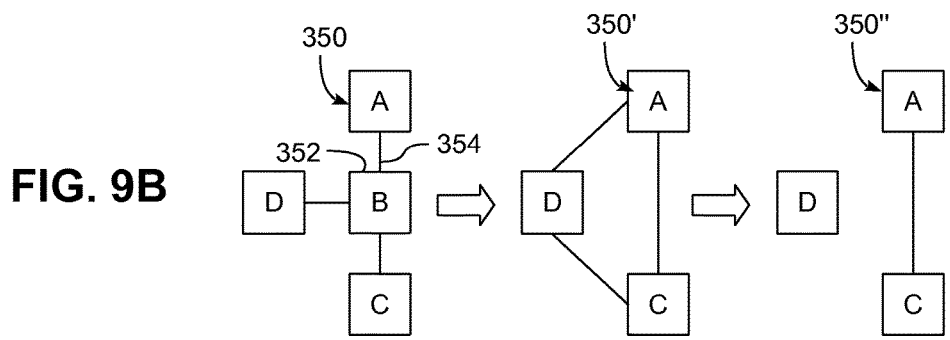
FIG. 9B is a connectivity graph for a set of cells from the grid of FIG. 9A, and illustrating a Z pinchout.

The techniques disclosed herein, as noted above, may apply to many generalized cases of small volume cells in a reservoir simulation grid. FIGS. 9A-9B and 10A-10B disclose two specific cases to which the same generalized techniques disclosed herein may be applied. For example, FIGS. 9A-9B illustrate a Z pinchout operation. FIG. 9A, for example, illustrates a grid 340 including a plurality of cells 342 arranged into layers z=1 to z=5, with the cells in layer z=3 representing a strata 344 of rock that tapers out in a horizontal extent. As the layer tapers out the cells have a vanishingly small volume and hence may introduce numerical problems within the simulation. Thus, for example, a cell B may be a small volume cell that neighbors a pair of cells A, C and D. As shown in FIG. 9B, a connectivity graph 350 representing the connections between cells A-C includes nodes 352 and paths 354 representing these connections. After performing a grid cell pinchout operation in the manner described herein, the connectivity graph is reduced as shown at 350', with cell B removed and a connection established between cells A, C and D. The connections A-D and A-C may be much smaller in magnitude that A-C, and as such, a decision may be made (e.g., by a user or by the system, such as in block 268 of FIG. 3) to drop these small magnitude connections. This results in a traditional Z pinch result, as illustrated by graph 350".

Figure 10A:
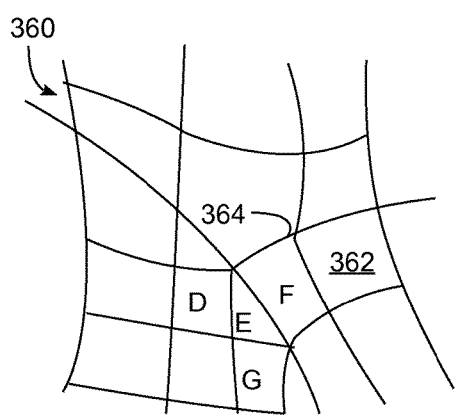
FIG. 10A illustrates another example grid for a geological formation.
Figure 10B:
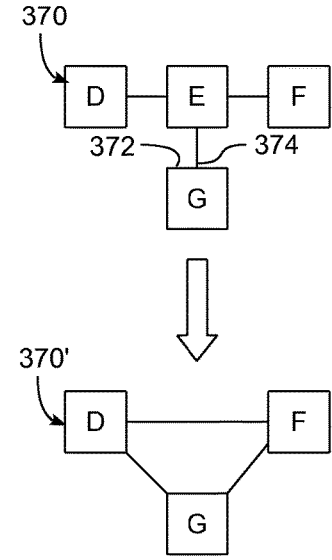
FIG. 10B is a connectivity graph for a set of cells from the grid of FIG. 10A, and illustrating an XY pinchout.

Similarly, FIGS. 10A-10B illustrate an XY pinchout operation, e.g., as caused by a "Y" shaped fault. FIG. 10A, for example, illustrates a grid 360 including a plurality of cells 362 bounded by a "Y" shaped fault 364. A cell E may be a small volume cell that neighbors three cells D, F and G, but with a more complex connection structure than the aforementioned cells discussed in the Z pinchout scenario. As shown in FIG. 10B, a connectivity graph 370 representing the connections between cells D-G includes nodes 372 and paths 374 representing these connections. After performing a grid cell pinchout operation in the manner described herein, the connectivity graph is reduced as shown at 370', with cell E removed and connections established between cells D, F and G.

Other scenarios, e.g., including more complex scenarios than the Z and XY pinchout scenarios described above, may be handled in a similar manner using the techniques described above. Therefore, the invention is not limited to the particular scenarios described herein.

While particular embodiments have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A method of decreasing runtime of a computer-implemented reservoir simulator, the method comprising, using one or more processors:
   accessing a reservoir simulation grid comprising a plurality of cells;
   executing a grid cell pinchout operation as a precedent to running a reservoir simulation for the reservoir simulation grid in the computer-implemented reservoir simulator to remove one or more pinch cells from the reservoir simulation grid and thereby decrease runtime of the reservoir simulation, wherein executing the grid cell pinchout operation comprises:
      determining the one or more pinch cells to be removed from the reservoir simulation grid;
      constructing a connectivity matrix representing transmissibilities between the one or more pinch cells and a plurality of background cells in the reservoir simulation grid that neighbor the one or more pinch cells, wherein the connectivity matrix includes a plurality of entries arranged in a plurality of rows and a plurality of columns, wherein the connectivity matrix includes a row of entries for each of the one or more pinch cells and the plurality of background cells, wherein the connectivity matrix includes a column of entries for each of the one or more pinch cells and the plurality of background cells, and wherein the connectivity matrix includes, for each connected pair of cells among the one or more pinch cells and the plurality of background cells, an entry from among the plurality of entries that stores a transmissibility value associated with the transmissibility between the connected pair of cells;

determining a first sub-matrix of the connectivity matrix representing transmissibilities between background cells;

determining a second sub-matrix of the connectivity matrix representing transmissibilities between pinch cells;

inverting the second sub-matrix; and removing the one or more pinch cells from the reservoir simulation grid, wherein removing the one or more pinch cells from the reservoir simulation grid includes determining a Schur complement of the connectivity matrix to generate a reduced connectivity matrix from the connectivity matrix, the reduced connectivity matrix representing transmissibilities between the plurality of background cells, and wherein determining the Schur complement of the connectivity matrix includes performing a matrix multiplication using the inverted second sub-matrix and performing a matrix subtraction that subtracts a result of the matrix multiplication from the first sub-matrix; and running the reservoir simulation in the computer-implemented reservoir simulator using the reservoir simulation grid after the one or more pinch cells have been removed from the reservoir simulation grid such that the reservoir simulation is run without the one or more pinch cells being in the reservoir simulation grid.

2. The method of claim 1, further comprising:

determining third and fourth sub-matrices of the connectivity matrix, the third sub-matrix representing transmissibilities from background cells to pinch cells, and the fourth sub-matrix representing transmissibilities from pinch cells to background cells, wherein performing the matrix multiplication using the inverted second sub-matrix includes performing the matrix multiplication between the inverted second sub-matrix and the third and fourth sub-matrices.

3. The method of claim 2, further comprising:

arranging each of the plurality of rows of entries to separate the rows for the plurality of background cells from the one or more rows for the one or more pinch cells; and arranging each of the plurality of columns of entries to separate the columns for the plurality of background cells from the one or more columns for the one or more pinch cells.

4. The method of claim 3, wherein arranging each of the plurality of rows of entries includes reordering the plurality of rows of entries, and wherein arranging each of the plurality of columns of entries includes reordering the plurality of columns of entries.

5. The method of claim 1, wherein determining the one or more pinch cells is performed in response to user input.

6. The method of claim 1, wherein determining the one or more pinch cells includes automatically determining the one or more pinch cells based on a small cell criterion.

7. The method of claim 1, further comprising dropping at least one insignificant value from the reduced connectivity matrix, wherein dropping the at least one insignificant value includes setting a first transmissivity value in the reduced connectivity matrix to zero in response to the first transmissivity value failing to meet a threshold.

8. The method of claim 1, wherein the connectivity matrix only represents transmissibilities of pinch cells and background cells that neighbor pinch cells.

9. The method of claim 1, further comprising distributing a plurality of domains of the reservoir simulation grid to a plurality of parallel processes, wherein the connectivity matrix is a first connectivity matrix associated with a first domain among the plurality of domains, wherein constructing the first connectivity matrix is performed by a first process among the plurality of parallel processes, the method further comprising constructing a second connectivity matrix for a second domain among the plurality of domains with a second process among the plurality of parallel processes.

10. The method of claim 9, wherein constructing the first connectivity matrix includes the first process making an inter-domain call to the second process to obtain a transmissibility for a cell in the second domain of the reservoir simulation grid.

11. An apparatus, comprising:

at least one processor; and program code configured upon execution by the at least one processor to decrease runtime of a computer-implemented reservoir simulator by:

accessing a reservoir simulation grid comprising a plurality of cells;

executing a grid cell pinchout operation as a precedent to running a reservoir simulation for the reservoir simulation grid in the computer-implemented reservoir simulator to remove one or more pinch cells from the reservoir simulation grid and thereby decrease runtime of the reservoir simulation, wherein executing the grid cell pinchout operation comprises:

determining the one or more pinch cells to be removed from the reservoir simulation grid;

constructing a connectivity matrix representing transmissibilities between the one or more pinch cells and a plurality of background cells in the reservoir simulation grid that neighbor the one or more pinch cells, wherein the connectivity matrix includes a plurality of entries arranged in a plurality of rows and a plurality of columns, wherein the connectivity matrix includes a row of entries for each of the one or more pinch cells and the plurality of background cells, wherein the connectivity matrix includes a column of entries for each of the one or more pinch cells and the plurality of background cells, and wherein the connectivity matrix includes, for each connected pair of cells among the one or more pinch cells and the plurality of background cells, an entry from among the plurality of entries that stores a transmissibility value associated with the transmissibility between the connected pair of cells;

determining a first sub-matrix of the connectivity matrix representing transmissibilities between background cells;

determining a second sub-matrix of the connectivity matrix representing transmissibilities between pinch cells;

inverting the second sub-matrix; and removing the one or more pinch cells from the reservoir simulation grid, wherein removing the one or more pinch cells from the reservoir simulation grid includes determining a Schur complement of the connectivity matrix to generate a reduced connectivity matrix from the connectivity matrix, the reduced connectivity matrix representing transmissibilities between the plurality of background cells, and wherein determining the Schur complement of the connectivity matrix includes performing a matrix multiplication using the inverted second sub-matrix and performing a matrix subtraction that subtracts a result of the matrix multiplication from the first sub-matrix; and running the reservoir simulation in the computer-implemented reservoir simulator using the reservoir simulation grid after the one or more pinch cells have been removed from the reservoir simulation grid such that the reservoir simulation is run without the one or more pinch cells being in the reservoir simulation grid.

12. The apparatus of claim 11, wherein the program code is further configured to determine third and fourth sub-matrices of the connectivity matrix, the third sub-matrix representing transmissibilities from background cells to pinch cells, and the fourth sub-matrix representing transmissibilities from pinch cells to background cells, and to perform the matrix multiplication using the inverted second sub-matrix by performing the matrix multiplication between the inverted second sub-matrix and the third and fourth sub-matrices.

13. The apparatus of claim 12, wherein the program code is configured to arrange each of the plurality of rows of entries to separate the rows for the plurality of background cells from the one or more rows for the one or more pinch cells, and arrange each of the plurality of columns of entries to separate the columns for the plurality of background cells from the one or more columns for the one or more pinch cells.

14. The apparatus of claim 11, wherein the program code is configured to determine the one or more pinch cells by automatically determining the one or more pinch cells based on a small cell criterion.

15. The apparatus of claim 11, wherein the program code is further configured to drop at least one insignificant value from the reduced connectivity matrix by setting a first transmissivity value in the reduced connectivity matrix to zero in response to the first transmissivity value failing to meet a threshold.

16. The apparatus of claim 11, wherein the program code includes a reservoir simulator.

17. The apparatus of claim 11, wherein the program code is configured to distribute a plurality of domains of the reservoir simulation grid to a plurality of parallel processes, wherein the connectivity matrix is a first connectivity matrix associated with a first domain among the plurality of domains, wherein the program code is configured to construct the first connectivity matrix with a first process among the plurality of parallel processes, the program code further configured to construct a second connectivity matrix for a second domain among the plurality of domains with a second process among the plurality of parallel processes.

18. The apparatus of claim 17, wherein the first process is configured to make an inter-domain call to the second process to obtain a transmissibility for a cell in the second domain of the reservoir simulation grid.

19. A program product, comprising:
a non-transitory computer readable medium; and
program code stored on the computer readable medium and configured upon execution by at least one processor to decrease runtime of a computer-implemented reservoir simulator by:

accessing a reservoir simulation grid comprising a plurality of cells;

executing a grid cell pinchout operation as a precedent to running a reservoir simulation for the reservoir simulation grid in the computer-implemented reservoir simulator to remove one or more pinch cells from the reservoir simulation grid and thereby decrease runtime of the reservoir simulation, wherein executing the grid cell pinchout operation comprises:

determining the one or more pinch cells to be removed from the reservoir simulation grid;

constructing a connectivity matrix representing transmissibilities between the one or more pinch cells and a plurality of background cells in the reservoir simulation grid that neighbor the one or more pinch cells, wherein the connectivity matrix includes a plurality of entries arranged in a plurality of rows and a plurality of columns, wherein the connectivity matrix includes a row of entries for each of the one or more pinch cells and the plurality of background cells, wherein the connectivity matrix includes a column of entries for each of the one or more pinch cells and the plurality of background cells, and wherein the connectivity matrix includes, for each connected pair of cells among the one or more pinch cells and the plurality of background cells, an entry from among the plurality of entries that stores a transmissibility value associated with the transmissibility between the connected pair of cells;

determining a first sub-matrix of the connectivity matrix representing transmissibilities between background cells;

determining a second sub-matrix of the connectivity matrix representing transmissibilities between pinch cells;

inverting the second sub-matrix; and removing the one or more pinch cells from the reservoir simulation grid, wherein removing the one or more pinch cells from the reservoir simulation grid includes determining a Schur complement of the connectivity matrix to generate a reduced connectivity matrix from the connectivity matrix, the reduced connectivity matrix representing transmissibilities between the plurality of background cells, and wherein determining the Schur complement of the connectivity matrix includes performing a matrix multiplication using the inverted second sub-matrix and performing a matrix subtraction that subtracts a result of the matrix multiplication from the first sub-matrix; and running the reservoir simulation in the computer-implemented reservoir simulator using the reservoir simulation grid after the one or more pinch cells have been removed from the reservoir simulation grid such that the reservoir simulation is run without the one or more pinch cells being in the reservoir simulation grid.

* * * * *